United States Patent
Wei

(10) Patent No.: US 10,240,714 B2
(45) Date of Patent: Mar. 26, 2019

(54) STABILIZER AND ANGLE ADJUSTING METHOD THEREOF

(71) Applicant: Chengyun Wei, Guangxi (CN)

(72) Inventor: Chengyun Wei, Guangxi (CN)

( * ) Notice: Subject to any disclaimer, the term of this patent is extended or adjusted under 35 U.S.C. 154(b) by 0 days.

(21) Appl. No.: 15/842,854

(22) Filed: Dec. 14, 2017

(65) Prior Publication Data

US 2019/0063668 A1   Feb. 28, 2019

(30) Foreign Application Priority Data

Aug. 23, 2017 (CN) .......................... 2017 1 0730454

(51) Int. Cl.

| | |
|---|---|
| *F16M 11/20* | (2006.01) |
| *F16M 11/12* | (2006.01) |
| *G03B 17/56* | (2006.01) |
| *H04N 5/232* | (2006.01) |
| *F16M 11/10* | (2006.01) |

(52) U.S. Cl.
CPC ......... *F16M 11/2035* (2013.01); *F16M 11/10* (2013.01); *F16M 11/123* (2013.01); *G03B 17/561* (2013.01); *F16M 2200/041* (2013.01); *H04N 5/23248* (2013.01)

(58) Field of Classification Search
CPC combination set(s) only.
See application file for complete search history.

(56) References Cited

U.S. PATENT DOCUMENTS

| | | | | |
|---|---|---|---|---|
| 2017/0106998 A1* | 4/2017 | Zhou | ...................... | B64D 47/08 |
| 2017/0192341 A1* | 7/2017 | Casarez | ............... | G03B 17/561 |
| 2017/0227162 A1* | 8/2017 | Saika | ..................... | F16M 13/02 |
| 2018/0124304 A1* | 5/2018 | Niemeyer | .......... | H04N 5/23203 |

\* cited by examiner

*Primary Examiner* — Paul M Berardesca

(57) ABSTRACT

The invention provides a stabilizer, comprising a first motor, a second motor and a third motor sequentially rotatably connected via connecting arms. The first motor is fixedly mounted on a mount for the first motor, and a rotating shaft of the third motor is connected with a carrier for mounting photographic equipment. A rotation axis α of the first motor, a rotation axis β of the second motor, and a rotation axis γ of the third motor consistently intersect at a point A. The rotation axis β of the second motor is perpendicular to the rotation axis γ of the third motor, and the rotation axis β of the second motor and the rotation axis α of the first motor forms an acute angle. An angle adjusting method of the stabilizer is further provided.

7 Claims, 4 Drawing Sheets

STABILIZER AND ANGLE ADJUSTING METHOD THEREOF

CROSS-REFERENCE TO PRIOR APPLICATION

This application claims the benefit of Chinese Patent Application No. 201710730454.8 filed on Aug. 23, 2017, the contents of which are incorporated herein by reference.

FIELD OF THE INVENTION

The present invention relates to the technical field of photographic equipment, more particularly to a stabilizer and an angle adjusting method thereof.

BACKGROUND OF THE INVENTION

The stabilizer is used for fixing a target object and adjusting its position (e.g. controlling its direction and its rolling and pitching angles), and for stabilizing it at a determined position, so as to achieve a stable and smooth multi-angle shooting. Usually, the target object may be a camera, a mobile phone, etc.

Existing stabilizers usually comprise three orthogonally arranged motors which are perpendicular to each other. The three motors include an X-axis motor which is connected with a carrier for fixing the mentioned target object such as a camera or a mobile phone, a Y-axis motor, and a Z-axis motor. Such orthogonal arrangement of motors may facilitate the adjustment of the gravity center for the stabilizer, but meanwhile, it has a disadvantage in that the use of the photographic equipment may be affected since the screen of the camera or mobile phone may be blocked by the Y-axis motor.

SUMMARY OF THE INVENTION

The present invention aims to provide a stabilizer, which can prevent the object carried on the carrier from being covered by the Y-axis motor, and an angle adjusting method of the stabilizer.

In order to achieve the above goal, the present invention provides a stabilizer, comprising a first motor, a second motor and a third motor which are sequentially rotatably connected via connecting arms, wherein the first motor is fixedly mounted on a mount for the first motor, and a rotating shaft of the third motor is connected with a carrier for mounting photographic equipment;

A rotation axis $\alpha$ of the first motor, a rotation axis $\beta$ of the second motor, and a rotation axis $\gamma$ of the third motor consistently intersect at a point A;

The rotation axis $\beta$ of the second motor is perpendicular to the rotation axis $\gamma$ of the third motor, and an angle formed between the rotation axis $\beta$ of the second motor and the rotation axis $\alpha$ of the first motor is an acute angle.

Preferably, a rotor of the first motor is connected with a stator of the second motor via a first connecting arm, a rotor of the second motor is connected with a stator of the third motor via a second connecting arm, and a rotor of the third motor is connected with the carrier via a third connecting arm;

The first connecting arm is driven by means of the first motor to rotate relative to the mount for the first motor, the second connecting arm is driven by means of the second motor to rotate relative to the first connecting arm, and the third connecting arm is driven by means of the third motor to rotate relative to the second connecting arm;

A controller for controlling the operations of the first motor, the second motor and the third motor, and a gyroscope and an accelerometer which are electrically connected with the controller are further provided.

Preferably, both the first connecting arm and the second connecting arm comprise a first connecting rod and a second connecting rod which are rod-shaped and connected with each other, and the first connecting rod and the second connecting rod of both the first connecting arm and the second connecting arm form an angle $\theta$;

The stabilizer includes two position states:

When the stabilizer is in a portable folded state, the second connecting arm may be driven by the second motor to rotate about the rotation axis $\beta$ until the second connecting arm is folded above the first connecting arm;

When the stabilizer is in a working state, the second connecting arm may be driven by the second motor to rotate about the rotation axis $\beta$ until the second connecting arm is not folded above the first connecting arm.

Preferably, when the stabilizer is in the working state, the first motor may be positioned above or below the second motor with respect to the height direction.

Preferably, the carrier is arranged with a clamping portion for clamping the photographic equipment. With respect to the height direction, the second motor is positioned below the clamping portion when the first motor is positioned below the second motor, and the second motor is positioned above the clamping portion when the first motor is positioned above the second motor with respect to the height direction.

Preferably, an angle formed between the rotation axis $\beta$ of the second motor and the rotation axis $\alpha$ of the first motor is in a range of 30-60 degrees.

The present invention further provides an angle adjusting method for the above-mentioned stabilizer, comprising steps as follows:

S1. Detecting angular velocity and accelerated velocity of the photographic equipment carried on a carrier in real time by means of a gyroscope and an accelerometer, and transmitting the detected signals to a controller in real time;

S2. Upon the received angular velocity and accelerated velocity signals, by means of the controller, calculating a first rotation angular offset of the photographic equipment carried on the carrier at the current detecting time relative to the rotation axis $\alpha$, the rotation axis $\beta$ and the rotation axis $\gamma$ at the last detecting time, and calculating a second rotation angular offset of the rotation axis $\alpha$, the rotation axis $\beta$ and the rotation axis $\gamma$ at the current detecting time relative to the initial moment;

S3. Upon the above-mentioned first and second rotation angular offsets, by means of the controller, calculating the rotation angular back offsets of the rotation axis $\alpha$, the rotation axis $\beta$ and the rotation axis $\gamma$, and outputting control commands to control the first motor, the second motor and the third motor to rotate for the corresponding rotation angular back offsets until the carrier, i.e. the photographic equipment, returns to their angular positions at the initial moment.

The present invention provides a stabilizer, comprising the first motor, the second motor and the third motor, wherein the first motor is used for controlling the angle of the carrier in horizontal direction, and the third motor is used for controlling the angle of the carrier in pitching direction. Compared with conventional stabilizers with orthogonal arrangement, the axes of the three motors of the three-axis stabilizer are not necessary to be orthogonally arranged, and the diversity of the designs for the connecting arms can be improved. Moreover, the angle formed between the rotation axis β of the second motor and the rotation axis α of the first motor is an acute angle. In common states, the second motor is lower than the photographic equipment carried on the carrier in height, whereby the second motor may be misaligned with the photographic equipment carried on the carrier in height. Hence, the photographic equipment carried on the carrier will not be covered by the second motor of the present stabilizer, thereby greatly improving the handling performance of the stabilizer by the user.

The present invention further provides an angle adjusting method for the above-mentioned stabilizer, to stabilize the photographic equipment by controlling the rotation of all motors in real time when the stabilizer is in motion.

In the figures: 10. first motor; 11. first connecting arm; 20. second motor; 21. second connecting arm; 30. third motor; 31. third connecting arm; 40. carrier; 50. handle.

DETAILED DESCRIPTION OF ILLUSTRATED EMBODIMENTS

The present invention will be further explained below in detail with reference to figures and embodiments. Those embodiments are intended to be illustrative rather than limiting.

Existing stabilizers available in the market usually comprise three orthogonally arranged motors which are perpendicular to each other. Herein, the three motors include an X-axis motor, a Y-axis motor, and a Z-axis motor. The X-axis motor is connected with a carrier for fixing the mentioned target object which usually is a camera or a mobile phone. Such orthogonal arrangement of motors may facilitate the adjustment of the gravity center of the stabilizer. However, in the practical use, particularly in the case that a mobile phone or camera is carried in order to perform shooting, it has a disadvantage in that the use of the photographic equipment may be affected since the screen of the camera or the mobile phone may be covered by the Y-axis motor.

Figure 1:
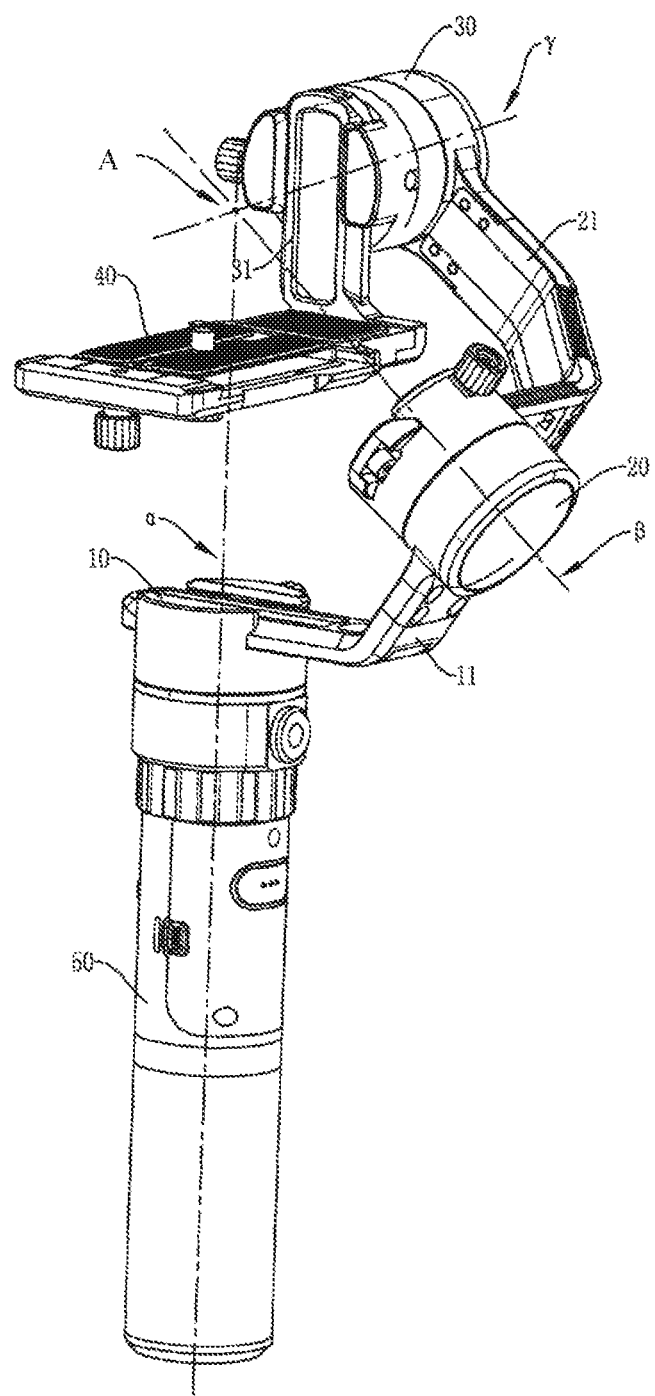
FIG. 1 is a perspective view showing the structure of a stabilizer according to an embodiment of the present invention.
Figure 2:
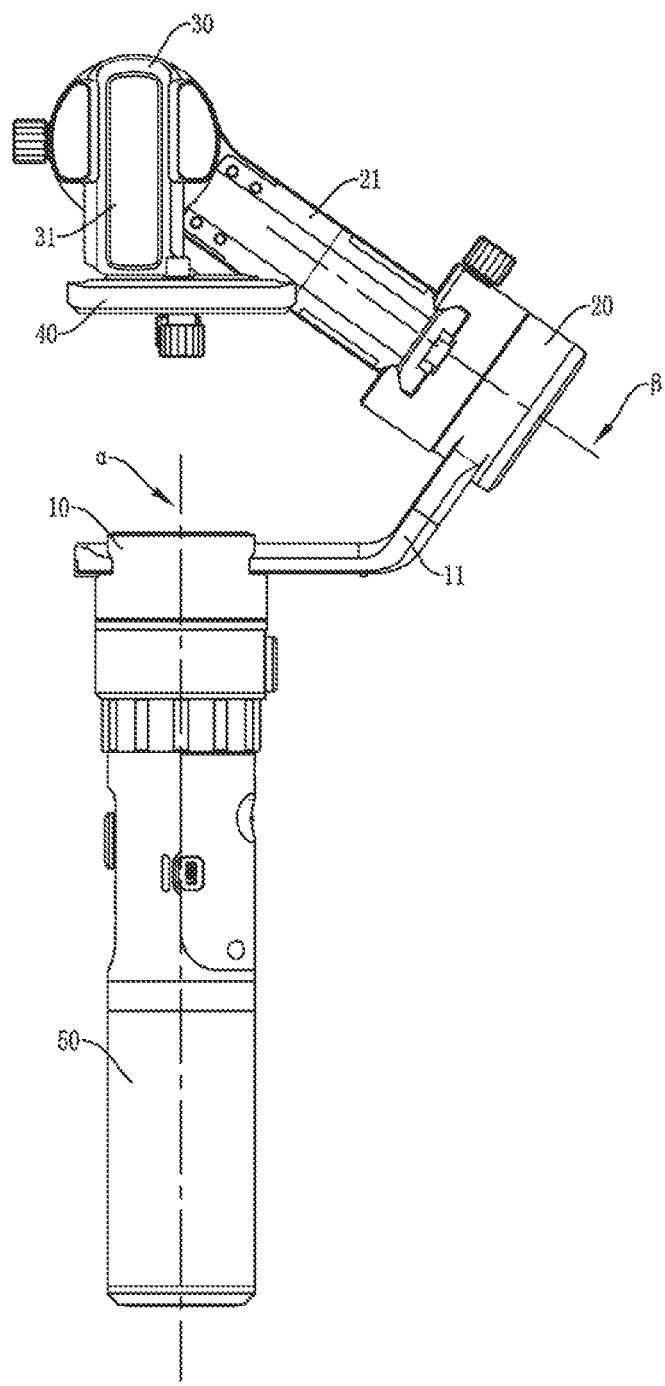
FIG. 2 is a perspective view showing the structure of a stabilizer according to an embodiment of the present invention, in which a first motor is arranged below a second motor.
Figure 3:
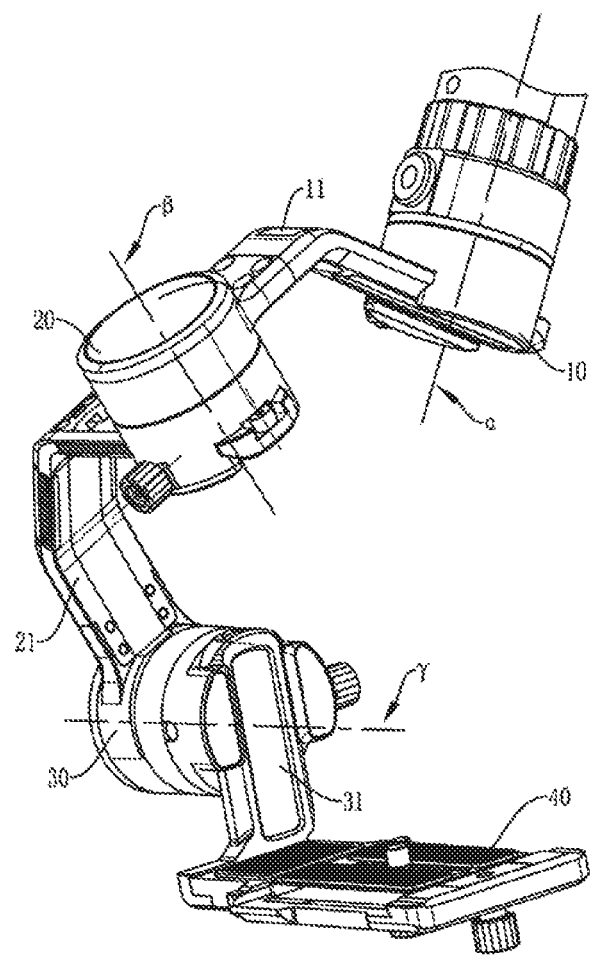
FIG. 3 is a schematic drawing of a stabilizer according to an embodiment of the present invention, in which a first motor is arranged above a second motor.

Referring to FIGS. 1-3, a stabilizer according to a preferred embodiment of the present invention comprises three motors sequentially connected via connecting arms. Herein, unlike conventional arrangement of the motor of the stabilizer, one motor is obliquely arranged, and the obliquely arranged second motor is provided instead of the Y-axis motor provided in the conventional arrangement. That is, the arrangement of a rolling motor provided in the conventional device is changed. In this way, during normal operation, as shown in FIG. 1, when the handle is in a vertical position, the photographic equipment carried on the carrier with respect to the height direction is higher than the second motor, thereby preventing the photographic equipment from being covered by the Y-axis motor (the rolling motor), facilitating real time observation through the photographic equipment by the user, and greatly improving the handling performance of the stabilizer.

Based on the above, as shown in FIG. 1, a stabilizer is provided in an embodiment, comprising a first motor 10, a second motor 20 and a third motor 30 which are sequentially rotatably connected via connecting arms, wherein the first motor 10 is fixedly mounted on a mount for the first motor, and a rotating shaft of the third motor 30 is connected with a carrier 40. Herein, the first motor 10 serves as a horizontal motor of the conventional stabilizer equipment, which is used for controlling the rotation angle in horizontal direction, and the third motor 30 serves as a pitch motor of the conventional stabilizer equipment, which is used for controlling the rotation angle in pitching direction.

In particular, the first motor 10 is used for controlling the angles of the second motor 20 and the third motor 30 in the horizontal direction and ensuring simultaneous rotation of the second motor 20 and the third motor 30 in the horizontal direction.

Herein, the mount for the first motor is used for mounting and fixing the first motor 10.

In particular, a rotation axis α of the first motor 10, a rotation axis β of the second motor 20, and a rotation axis γ of the third motor 30 consistently intersect at a point A. At the same time, the rotation axis β of the second motor 20 is perpendicular to the rotation axis γ of the third motor 30, and an angle formed between the rotation axis β of the second motor 20 and the rotation axis α of the first motor 10 is an acute angle.

Herein, the rotation axis α and the rotation axis β intersect at a point A, such that the rotation axis α and the rotation axis β lie within a common plane. At the same time, as shown in FIG. 1, the angle formed between the rotation axis β of the second motor 20 and the rotation axis α of the first motor 10 is an acute angle. Due to the acute angle formed between the rotation axis β and the rotation axis α, the carrier 40 is generally lower than the third motor 30 and higher than the second motor 20 in the case that the handle 50 is positioned below the first motor 10, thereby in most cases effectively overcoming the problem that the photographic equipment carried by existing stabilizers with orthogonally arranged motors may be covered by the Y-axis motor (the rolling motor), as shown in FIG. 1.

At the same time, the rotation axis β of the second motor 20 is perpendicular to the rotation axis γ of the third motor 30. Compared with conventional stabilizer equipment, the stabilizer of the present invention provides a changed arrangement of the rotating shaft of the Y-axis motor. From the composition and decomposition of motions, it can be seen that the stabilizer of the present invention enables a simultaneous adjustment of the angle of the carrier 40 in various directions of the X-axis, the Y-axis and the Z-axis. Meanwhile, with respect to orthogonal arrangement of the motors of the conventional stabilizer equipment, the arrangement of the rotation axis of the Y-axis motor of conventional stabilizers is changed in the present invention, and the changed arrangement also facilitates the angle adjustment of the carrier 40 by the algorithm of the controller.

Preferably, referring to FIG. 1, a first connecting arm 11 is connected between the first motor 10 and the second motor 20, a second connecting arm 21 is connected between the second motor 20 and the third motor 30, and a third connecting arm 31 is connected between the third motor 30 and the carrier 40.

Preferably, the first motor 10 is used for driving the first connecting arm 11 to rotate relative to the mount for the first motor, the second motor 20 is used for driving the second connecting arm 21 to rotate relative to the first connecting arm 11, and the third motor 30 is used for driving the third connecting arm 31 to rotate relative to the second connecting arm 21. Herein, the first connecting arm 11, the second connecting arm 21 and the third connecting arm 31 support the body of the stabilizer and connect the motors, and also support the photographic equipment carried on the carrier 40.

In particular, the first connecting arm 11, the second connecting arm 21 and the third connecting arm 31 are rotated in coordination, allowing an adjustment of the angular position of the photographic equipment carried on the carrier 40 in horizontal direction, rolling direction and pitching direction.

Preferably, a controller for controlling operations of the first motor 10, the second motor 20 and the third motor 30 is provided, and a gyroscope and an accelerometer which are electrically connected with the controller are further provided, wherein the gyroscope may be used for detecting the angular velocity of the moving stabilizer and photographic equipment, and the accelerometer may be used for detecting the accelerated velocity of the moving stabilizer and photographic equipment.

Preferably, the mount for the first motor 10 is fixedly connected with a handle 50, and the controller for controlling operations of the first motor 10, the second motor 20 and the third motor 30 is arranged on the handle 50.

Referring to FIG. 1, when using the stabilizer, the stabilizer may be held via the handle 50, within which the power supply and the controller are arranged. The change of the position of the stabilizer may be detected by the controller, and then the angles at which the individual motors of the stabilizer have to be rotated may be calculated. Then, by means of the controller, motion parameters may be transmitted to the first motor 10, the second motor 20 and the third motor 30, and the operations of the first motor 10, the second motor 20 and the third motor 30 may be controlled, so as to achieve a coordinate adjustment of the position of the carrier 40 in various directions, whereby the target object carried on the carrier 40 may be stabilized at a determined position by the stabilizer.

Preferably, both the first connecting arm 11 and the second connecting arm 21 comprise a first connecting rod and a second connecting rod which are rod-shaped and connected with each other, and the first connecting rod and the second connecting rod of both the first connecting arm 11 and the second connecting arm 21 form an angle θ. Since the first connecting rod and the second connecting rod are connected and arranged in a non-collinear manner, the first motor 10, the second motor 20 and the third motor 30 are allowed to have height differences in the height direction.

In particular, the first connecting rod and the second connecting rod of the first connecting arm 11 and the second connecting arm 21 form a ⟨ -shaped obtuse angle. Herein, the angle θ formed between the first connecting rod and the second connecting rod of the first connecting arm 11 and the second connecting arm 21 may be 100 degrees, 105 degrees, 110 degrees, 115 degrees, 120 degrees, 125 degrees, 130 degrees, 135 degrees, 140 degrees, 145 degrees, 150 degrees, 160 degrees, 165 degrees, or 170 degrees.

Preferably, the stabilizer includes two states: a portable folded state and a working state.

When the stabilizer is in the portable folded state, the second connecting arm 21 may be driven by the second motor 20 to rotate about the rotation axis β until the second connecting arm 21 is folded above the first connecting arm 11. When it is in the portable folded state, the second connecting arm 21 of the stabilizer is folded above the first connecting arm 11, thereby reducing the volume of the stabilizer and facilitating the portability.

When the stabilizer is in the working state, the second connecting arm 21 may be driven by the second motor 20 to rotate about the rotation axis β until the second connecting arm 21 is not folded above the first connecting arm 11.

Furthermore, when the stabilizer is in the working state, the first motor 10 may be positioned above or below the second motor 20 with respect to the height direction. Herein, the handle is positioned below the second motor 20 in the case that the stabilizer is used with the handle being held in a forward direction, and the handle is positioned above the second motor 20 in the case that the stabilizer is used with the handle being held in a reverse direction.

Furthermore, the carrier 40 is arranged with a clamping portion for clamping the photographic equipment. In the case that the stabilizer is used with the handle being held in a forward direction, the handle is positioned below the second motor 20, the first motor 10 is positioned below the second motor 20, and the second motor 20 is positioned below the clamping portion, with respect to the height direction. Referring to FIG. 1 accordingly, since the second motor 20 is positioned below the clamping portion, the photographic equipment positioned at the clamping portion may be prevented from being covered by the second motor 20.

Furthermore, with respect to the height direction, when the first motor 10 is positioned above the second motor 20, that is, in the case that the stabilizer is used with the handle being held in a reverse direction, the handle is positioned above the second motor 20, and the second motor 20 is positioned above the clamping portion. Accordingly, since the second motor 20 is positioned above the clamping portion, the photographic equipment positioned at the clamping portion may be prevented from being covered by the second motor 20.

Preferably, the angle formed between the rotation axis β of the second motor 20 and the rotation axis α of the first motor 10 is in a range of 30-60 degrees. In the case that the angle formed between the rotation axis β of the second motor 20 and the rotation axis α of the first motor 10 is in a range of 30-60 degrees, the carrier 40 and the photographic equipment carried on the carrier 40 may be more effectively prevented from being covered by the second motor 20.

Preferably, the angle formed between the rotation axis β of the second motor 20 and the rotation axis α of the first motor 10 may be 30 degrees, 35 degrees, 40 degrees, 45 degrees, 50 degrees, 55 degrees, or 60 degrees.

Figure 4:
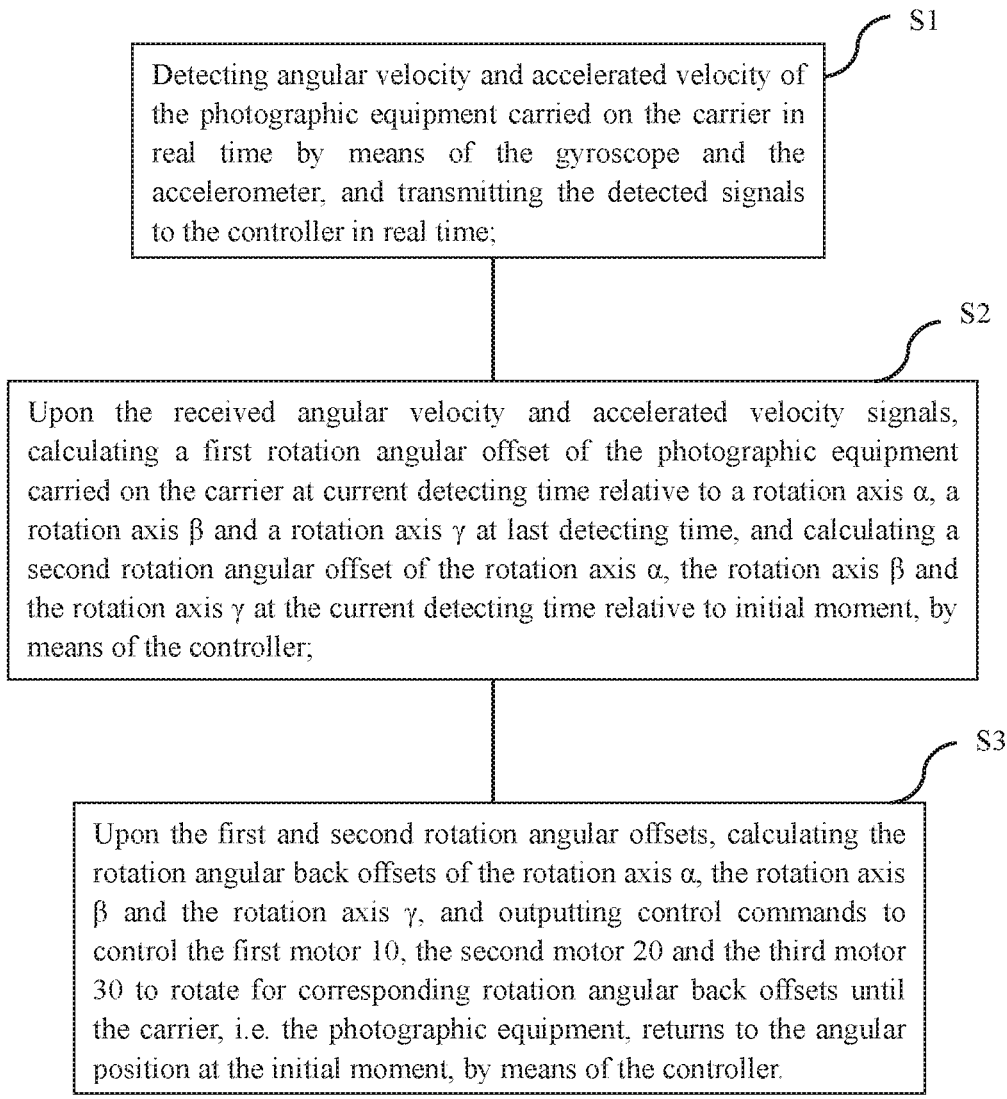
FIG. 4 is a schematic process diagram showing a method for adjusting an angle of a stabilizer according to an embodiment of the present invention.

In the meantime, referring to FIG. 4, the present invention further provides an angle adjusting method for the stabilizer, comprising steps as follows.

S1. Detecting the angular velocity and the accelerated velocity of the photographic equipment carried on the carrier in real time by means of a gyroscope and an accelerometer, and transmitting the detected signals to a controller in real time;

Herein, detecting the values of the angular velocity and the angular acceleration of the photographic equipment which is fixed on the stabilizer and is in motion by means of the gyroscope, so as to facilitate the subsequent real time control of the rotation of the photographic equipment by means of three motors.

S2. Upon the received angular velocity and accelerated velocity signals, calculating a first rotation angular offset of the photographic equipment carried on the carrier at the current detecting time relative to the rotation axis α, the rotation axis β and the rotation axis γ at the last detecting time, and calculating a second rotation angular offset of the rotation axis α, the rotation axis β and the rotation axis γ at the current detecting time relative to the initial moment, by means of the controller;

From the decomposition and calculation of motions by the controller, the rotation angular offsets of the photographic equipment relative to the rotation axis α, the rotation axis β and the rotation axis γ may be obtained, to facilitate the subsequent control of the angles of the photographic equipment respectively in three rotation axes including the rotation axis α, the rotation axis β and the rotation axis γ, by means of the first motor 10, the second motor 20 and the third motor 30.

S3. Upon the above-mentioned first and second rotation angular offsets, calculating the rotation angular back offsets of the rotation axis α, the rotation axis β and the rotation axis γ by means of the controller, and outputting control commands to control the first motor 10, the second motor 20 and the third motor 30 to rotate for the corresponding rotation angular back offsets until the carrier, i.e. the photographic equipment, returns to their angular positions at the initial moment.

With the calculation by means of the controller, the angles at which the first motor 10, the second motor 20 and the third motor 30 have to be rotated may be obtained, and the angular position of the photographic equipment may be returned and corrected in real time upon each detecting period. The rotations of the first connecting arm 11, the second connecting arm and the third connecting arm 31 are controlled in real time by means of the first motor 10, the second motor 20 and the third motor 30, so as to achieve a precise control of the carrier 40, i.e. the photographic equipment, and maintain the carrier 40, i.e. the photographic equipment, at the initial angular position all the time to achieve a stable and smooth rotation of the lens of the photographic equipment and achieve a stable angular position of the photographic equipment.

Preferably, the first motor 10, the second motor 20 and the third motor 30 are respectively arranged with a first magnetic encoder, a second magnetic encoder and a third magnetic encoder, which are respectively electrically connected with the controller to feedback the angles and the angular velocities at which the first motor 10, the second motor 20 and the third motor 30 are rotated, to the controller.

In conclusion, the stabilizer according to the embodiment of the present invention comprises the first motor 10, the second motor 20 and the third motor 30 which are sequentially rotatably connected via connecting arms. Herein, the first motor 10 is used for controlling the angle of the carrier 40 in horizontal direction, and the third motor 30 is used for controlling the angle of the carrier 40 in pitching direction. Compared with existing stabilizers, the angle formed between the rotation axis β of the second motor 20 and the rotation axis α of the first motor 10 is an acute angle. Compared with conventional stabilizers with orthogonal arrangement, the axes of the three motors of the three-axis stabilizer are not necessary to be orthogonally arranged, and the diversity of the designs of the connecting arms can be improved. Meanwhile, in common general using states, the photographic equipment carried on the carrier 40 of the stabilizer is higher than the second motor 20, such that the photographic equipment carried on the carrier 40 will not be covered by the second motor 20 of the present stabilizer, thereby greatly improving the handling performance of the stabilizer by the user. The present invention further provides the angle adjusting method for the stabilizer, for controlling the present stabilizer and thus stabilizing the photographic equipment.

All the above are merely the preferred embodiments of the present invention. It should be noted that, those skilled in the art may change or modify the above disclosed technical contents to obtain equivalent embodiments without departing from the principle and scope of the present invention. The present invention is intended to cover all changes and equivalent arrangements included within the principle and scope of the present invention.

The invention claimed is:

1. A stabilizer, comprising a first motor, a second motor and a third motor which are sequentially rotatably connected via a connecting arm, wherein the first motor is fixedly mounted on a mount for the first motor, and a rotating shaft of the third motor is connected with a carrier for mounting photographic equipment;
    a rotation axis α of the first motor, a rotation axis β of the second motor, and a rotation axis γ of the third motor consistently intersect at a point A;
    the rotation axis β of the second motor is perpendicular to the rotation axis γ of the third motor, and an angle formed between the rotation axis β of the second motor and the rotation axis α of the first motor is an acute angle.

2. The stabilizer according to claim 1, characterized in that: a rotor of the first motor is connected with a stator of the second motor via a first connecting arm, a rotor of the second motor is connected with a stator of the third motor via a second connecting arm, and a rotor of the third motor is connected with the carrier via a third connecting arm;
    the first connecting arm is driven by means of the first motor to rotate relative to the mount for the first motor, the second connecting arm is driven by means of the second motor to rotate relative to the first connecting arm, and the third connecting arm is driven by means of the third motor to rotate relative to the second connecting arm; and
    a controller for controlling operations of the first motor, the second motor and the third motor, and a gyroscope and an accelerometer which are electrically connected with the controller are further provided.

3. The stabilizer according to claim 2, characterized in that: both the first connecting arm and the second connecting arm comprise a first connecting rod and a second connecting rod which are rod-shaped and connected with each other, and the first connecting rod and the second connecting rod of both the first connecting arm and the second connecting arm form an angle θ;
    the stabilizer includes two position states:
    when the stabilizer is in a portable folded state, the second connecting arm is driven by the second motor to rotate about the rotation axis β until the second connecting arm is folded above the first connecting arm;
    when the stabilizer is in a working state, the second connecting arm is driven by the second motor to rotate about the rotation axis β until the second connecting arm is not folded above the first connecting arm.

4. The stabilizer according to claim 3, characterized in that: when the stabilizer is in the working state, the first motor is positioned above or below the second motor with respect to height direction.

5. The stabilizer according to claim 4, characterized in that: the carrier is arranged with a clamping portion for clamping photographic equipment, and with respect to height direction: the second motor is positioned below the clamping portion when the first motor is positioned below the second motor, and the second motor is positioned above the clamping portion when the first motor is positioned above the second motor with respect to height direction.

6. The stabilizer according to claim 1, characterized in that: an angle formed between the rotation axis β of the second motor and the rotation axis α of the first motor is in a range of 30-60 degrees.

7. An angle adjusting method of a stabilizer according to claim 1, comprising steps as follows:
S1. detecting angular velocity and accelerated velocity of photographic equipment carried on a carrier in real time by means of a gyroscope and an accelerometer, and transmitting the detected signals to a controller in real time;
S2. upon the received angular velocity and accelerated velocity signals, calculating a first rotation angular offset of the photographic equipment carried on the carrier at current detecting time relative to a rotation axis α, a rotation axis β and a rotation axis γ at last detecting time, and calculating a second rotation angular offset of the rotation axis α, the rotation axis β and the rotation axis γ at the current detecting time relative to initial moment, by means of the controller;
S3. upon the first and second rotation angular offsets, calculating the rotation angular back offsets of the rotation axis α, the rotation axis β and the rotation axis γ, and outputting control commands to control the first motor, the second motor and the third motor to rotate for corresponding rotation angular back offsets until the carrier, i.e. the photographic equipment, returns to angular position at the initial moment, by means of the controller.

* * * * *